Patented July 4, 1950

2,513,725

UNITED STATES PATENT OFFICE 2,513,725

MANUFACTURE OF HOT AND COLD WATER SOLUBLE CELLULOSE ETHERS

Albert Aubrey Houghton, Datchet, England, assignor to Imperial Chemical Industries Limited, a corporation of Great Britain No Drawing. Application July 9, 1947, Serial No. 759,912. In Great Britain December 11, 1940

Section 1, Public Law 690, August 8, 1946
Patent expires December 11, 1960

9 Claims. (Cl. 260—232)

The present invention relates to the production of cellulose ethers soluble in hot water as well as cold water, but insoluble in volatile aliphatic alcohols wholly miscible with water, and more especially to the isolation of cellulose ethers of the aforesaid solubility characteristics from the alkaline reaction mixtures resulting from the etherification reaction by which cellulose ethers are ordinarily made.

Cellulose ethers soluble in hot and cold water and insoluble in ethyl alcohol and methyl alcohol include hydroxy-alkyl celluloses, e. g. hydroxyethyl cellulose, and water soluble salts of cellulose hydroxycarboxylic acids, especially water-soluble sodium salts of carboxymethyl cellulose. Carboxymethyl cellulose is also known as cellulose glycollic acid. By "soluble in hot water" we mean that the cellulose ether cannot be precipitated by heating a solution of it in water to the boiling point. Cellulose ethers of the kind described may be produced by the etherification of cellulose in the presence of sodium hydroxide with a compound having a reactive chlorine atom, e. g. a soluble salt of a chlorinated fatty acid, and the reaction mixture so obtained contains sodium chloride in addition to the cellulose ether required. The present invention relates in particular to the isolation of cellulose ethers of the kind described from such reaction mixtures.

Cellulose ethers soluble in hot and cold water are difficult to purify from the other soluble products of the reaction by which they are prepared. It is sometimes possible to render the ethers insoluble in water by strongly acidifying the reaction mixture, but this method is not always convenient even when it is possible, as for instance when the water soluble cellulose ether is itself a salt of a water insoluble cellulose hydroxy fatty acid, for the acidified product is frequently obtained in a gelatinous condition making it difficult to handle. It is also known to dissolve the reaction mixture in water and dialyze the solution, but dialysis is a tedious operation and has the disadvantage of leaving the water soluble cellulose ether in aqueous solution. The recovery of the ether from the aqueous solution in a readily redissolvable condition is in itself a troublesome or difficult operation, and it would be desirable to avoid dissolving the cellulose ether formed in the reaction mixture.

The cellulose ether in the reaction mixture can always be retained in fibrous form, notwithstanding its water solubility, by the inclusion in the reaction mixture of a proportion of alcohol or salts, and it is an object of the present invention to provide an improved process for the isolation of a cellulose ether of the kind described from a reaction mixture containing it in the still fibrous condition with an economy of alcohol and manipulation.

Attempts have been already made to isolate such cellulose ethers by exhaustively treating the alkaline reaction mixtures containing them with aqueous alcohol, but under the extraction conditions hitherto employed, this has always been a tedious process involving the use of excessive quantities of alcohol, and it is also to be inferred from the published work on the subject that the alcoholic concentrations of the aqueous alcoholic media, usually alcohol of 80% or higher strength, have been unsuitable for the removal of the sodium chloride present, making it necessary to wash several times with a large quantity of alcohol to obtain ethers of sufficient purity even for commercial purposes for which a .5% sodium chloride content is not considered excessive. In aqueous alcoholic media sodium hydroxide is preferentially retained to a very high degree by the cellulose ether, and we attribute the unsatisfactory results hitherto obtained in many alcohol purification processes of cellulose ethers of the kind described in part to a failure to neutralize the sodium hydroxide before separating the cellulose ether from the aqueous alcoholic medium, but we have found that even when the alkali is neutralized the alcohol concentration must be carefully adjusted. According to a further proposal additional sodium chloride is introduced into the etherification reaction mixture before the start of the reaction and the free sodium hydroxide is neutralized in the course of the extraction with alcohol, but the aqueous alcohol specified is of 80% strength.

According to the present invention the alkaline reaction mixture, containing the fibrous hot and cold water soluble cellulose ether, is approximately neutralized or acidified insufficiently to insolubilize the cellulose ether in water, with an acid having a sodium salt freely soluble in aqueous alcohol, or an ammonium salt of such acid; and, if not already unsaturated with respect to sodium chloride, is rendered so by the addition of water, these operations being conducted in the presence of sufficient alcohol to maintain the fibrous form of the cellulose ether; the liquid content of the mixture is then reduced by pressure, and the fibrous residue purified by alternate admixture with aqueous alcoholic media and expression of liquors, the alcoholic content of the media being so chosen that the expressed liquors are not saturated with respect to sodium chloride but maintain the fibrous condition of the cellulose ether. The alcohol used may be methyl or ethyl alcohol, and the loss of salts which takes place at each pressing necessitates using media stronger in alcohol in the later stages of the isolation than when the extraction first commences.

The neutralization should proceed at least so far as to reduce the pH of the mixture below 8, and the mixture may often, with advantage, be acidified so long as it is not acidified sufficiently to cause the cellulose ether to become insoluble in water.

While hydrochloric acid or ammonium chloride can be used for neutralizing at least part of the sodium hydroxide, we prefer to use inorganic or organic acids or ammonium salts thereof having sodium salts more freely soluble in aqueous alcohol than sodium chloride. As an inorganic acid there may be used for instance nitric acid, and as organic acids acetic, propionic, chloroacetic, formic, citric, tartaric, oxalic acid or phthalic anhydride, or the ammonium salts of these may be used. The water soluble salts of cellulose hydroxy fatty acids with strong bases form slightly alkaline solutions, but water soluble neutral or even slightly acid preparations of these can be obtained and may be preferred for technical application. The employment of acids having a dissociation constant less than that of the cellulose hydroxy fatty acid or ammonium salts is especially useful when such cellulose ethers are desired, since it minimizes any danger of insolubilizing the cellulose ether if more is added than is required to make the mixture strictly neutral. In the course of the subsequent purification the tendency moreover is for the acidity to diminish. On the other hand, in the presence of alcohol there is little tendency for free sodium hydroxide to be washed out.

A particularly convenient method of conducting the neutralization of the sodium hydroxide is to add a strong acid, such as nitric acid, to the reaction mixture until it has been brought to the neighbourhood of neutrality on the alkaline side and then to add a weak acid or an ammonium salt until the pH is at the desired value. For this purpose those acids with a dissociation constant less than that of the free cellulose hydroxy fatty acid are especially useful, for instance when isolating the sodium salt of cellulose glycollic acid we prefer to use an acid with a dissociation constant of less than $5 \times 10^{-5}$, such as acetic, propionic, or formic. It is convenient to carry out the neutralization by adding an aqueous alcoholic solution of the acid or ammonium salt.

The expression of the aqueous alcoholic liquors from the fibrous cellulose ether may conveniently be carried out by means of a mechanical press or by centrifuging. The mixing of the pressed material with the neutralizing and extraction media employed may conveniently be carried out in a mechanical mixing device such as a Werner Pfleiderer mixer. Since the composition of the liquid portion of the approximately neutralized or slightly acidified reaction mixture may be such that the sodium chloride is partly undissolved or present in supersaturated solution, and since the solubility of sodium chloride decreases very rapidly with increasing alcoholic concentration, and is further diminished by the presence of other sodium salts, media too strong in alcohol must not be used for extracting the salts. This can be avoided if a portion of the expressed liquor at every stage of the purification is tested in order to ensure that it is unsaturated with respect to sodium chloride. Should it be saturated the next aqueous alcoholic medium added should be of such strength or quantity as to render the reaction mixture again unsaturated, even if this entails interposing a wash with an aqueous alcoholic medium of lower alcoholic content, in the series of washes with media of increasing alcoholic content.

In testing the state of saturation of the press liquors, their chloride content may be determined before and after maintaining a test sample in contact with an excess of solid sodium chloride. If the press liquor is supersaturated, the liquor will diminish in chloride content, but if it is still unsaturated it will increase in chloride content.

As the process is continued and the alcoholic concentration of the liquor pressed out from the fibrous cellulose ether increases the cellulose ether in practice becomes less and less swollen so that the amount of liquor that cannot be pressed out from it decreases, and so long as no precipitation of sodium chloride is allowed to take place as a result of the admixture the amount of dissolved sodium chloride associated with the cellulose ether, as well as that of the other sodium salt, can be rapidly decreased without an excessive alcohol consumption. Moreover, since the rate of decrease of the solubility of sodium chloride in aqueous alcoholic solutions with increasing alcohol content is high, it is possible to return strongly alcoholic press liquors obtained towards the end of the process to an earlier part of the purification of a fresh batch, or to employ them in the etherification mixture if the etherification of the cellulose is to be carried out in an aqueous alcoholic medium. When dried off from strongly alcoholic liquors the cellulose ether is obtained in fibrous form easily dissolved in water.

In the isolation of the sodium salt of cellulose glycollic acid we have found that we can reduce the sodium chloride content to an amount satisfactory for ordinary commercial use with only an amount of alcohol about equal to four times the amount of cellulose used to make the ether, whereof part is added in the etherification mixture, part during the neutralization of the free alkali and part, amounting to a little more than half the total, is added in two washings with aqueous alcoholic media subsequent to the neutralization of the free alkali, that is to say, if the neutralization is done in the presence of just sufficient alcohol and water to leave the liquor just unsaturated with NaCl, it is only necessary to press, wash with a mixture of equal quantities of water and methylated spirits, press and wash again with undiluted methylated spirits to get a product sufficiently free from common salt for commercial use. If, however, a higher standard of purity is required more washings would be employed, the washings being with smaller quantities of media and the earlier washings having a smaller alcohol fraction. The process offers the further advantage that the water content of the cellulose ether is reduced simultaneously with the reduction of the salt content which both improves the product and makes it easier to dry.

The invention is further illustrated by the following examples in which the parts are parts by weight:

Example I 96 parts sulphite woodpulp sheet in the form of squares of 1/8" side containing 10 per cent moisture and 80 per cent alphacellulose are mechanically worked for one hour in a Werner Pfleiderer incorporating machine with a mixture of 40 parts sodium hydroxide, 40 parts water and 75 parts 94 per cent alcohol (methylated spirits). A solution of 58 parts sodium chloracetate in 69 parts water at a temperature of 5° C. is added to the shredded mixture, which has a temperature of about 15° C. and the machine is kept running for a further hour to mix the contents. The mixture is then transferred to loosely closed bins in a room at 27° C. The mixture commences to heat up and attains a temperature of about 60° C. in about 3 hours time, but is kept for a total period of 8 hours in the warm room. A mixture of about 37½ parts of 80 per cent acetic acid and 75 parts methylated spirits (94 per cent alcohol) and 125 parts water are then mechanically mixed with the reaction mixture, this amount being sufficient to give a mixture dissolving in water to yield a solution of pH 7. The undissolved mixture is then pressed in a cloth until its weight is reduced to 263 parts. The press liquor is still capable of dissolving sodium chloride and the cellulose ether still retains a fibrous form. 75 parts methylated spirits diluted with 75 parts water are now mechanically mixed with the fibrous residue, and the mixture is again pressed, this time until its weight is reduced to 221 parts. A further 100 parts undiluted methylated spirits (94 per cent alcohol) are now mixed with the residue, which is further pressed until it weighs 219 parts. The product is then dried and yields 120 parts dry material containing 3.6 per cent sodium chloride. The sodium cellulose glycollate dissolves easily in water to form a clear viscous neutral solution. Analysis shows that the degree of substitution is approximately 0.5 molar.

Example II 96 parts sulphite woodpulp sheet in the form of squares of 1/8" side containing 10 per cent moisture and 80 per cent alphacellulse are mechanically worked for one hour in a Werner Pfleiderer incorporating machine with a mixture of 40 parts sodium hydroxide, 40 parts water and 75 parts 94 per cent alcohol (methylated spirits). A solution of 58 parts sodium chloracetate in 69 parts water at a temperature of 5° C. is added to the shredded mixture, which has a temperature of about 15° C. and the machine is kept running for a further hour to mix the contents. The mixture is then transferred to loosely closed bins in a room at 27° C. The mixture commences to heat up and attains a temperature of about 60° C. in about 3 hours time, but is kept for a total period of 8 hours in the warm room. A mixture of 113½ parts of about 25% nitric acid and 75 parts methylated spirit (94% alcohol) and 35 parts of water are then added to the reaction mixture and mechanically mixed for a quarter of an hour. More 25% nitric acid is then added in small increments, the mechanical mixing being continued meanwhile, until the reaction mixture will no longer turn phenol red from yellow to red, but will still turn bromocresol purple from yellow to purple. This takes approximately 12.5 parts of the nitric acid. The undissolved mixture is then pressed in a cloth until its weight is reduced to 263 parts. The press liquor is still capable of dissolving sodium chloride and the cellulose ether still retains a fibrous state. 75 parts methylated spirits, diluted with 75 parts water are now mechanically mixed with the fibrous residue, and the mixture is again pressed, this time until its weight is reduced to 221 parts. A further 100 parts undiluted methylated spirits (94 per cent alcohol) are now mixed with the residue, which is further pressed until it weighs 219 parts. The product is similar to that of Example I.

Example III

The procedure of Example II is followed exactly except that after the mechanical mixing of nitric acid, methylated spirits and water with the reaction mixture for a quarter of an hour there is added instead of small increments of acetic acid until the reaction turns litmus red. The product is similar to that of Example I.

I claim:

1. A method of separating a cellulose ether which is soluble in hot and cold water from a cellulose etherification reaction mixture containing cellulose ether in a fibrous water-soluble condition with NaOH and NaCl as inorganic constituents, which comprises approximately neutralizing said mixture with a compound chosen from the group consisting of nitric acid, hydrochloric acid, saturated lower carboxylic acids, ammonium salts of said acids and carboxylic acid anhydrides, adding water and a water-miscible, non-solvent volatile saturated lower aliphatic alcohol, in amounts sufficient to hold all of the sodium chloride in solution while said cellulose ether remains in said fibrous condition, and subsequently expressing the bulk of the saline aqueous alcoholic solution from said fibrous cellulose ethers.

2. A method of separating a hot and cold water soluble sodium salt of a cellulose hydroxy fatty acid from a moist cellulose etherification reaction mixture containing said salt in a fibrous, water soluble condition with sodium chloride and sodium hydroxide as inorganic constituents, which comprises approximately neutralizing said reaction mixture with a compound chosen from the group consisting of nitric acid, hydrochloric acid, saturated lower carboxylic acids, ammonium salts of said acids and carboxylic acid anhydrides, adding water and a water-miscible, non-solvent volatile saturated lower aliphatic alcohol, in amounts sufficient to hold all of the sodium chloride in solution while said cellulose ether remains in its fibrous condition, expressing a portion of the saline aqueous alcoholic solution from said fibrous cellulose ether, washing said fibrous cellulose ether with an aqueous alcoholic solution while maintaining said cellulose ether in a fibrous condition and preventing precipitation of inorganic salts onto said cellulose ether and then expressing said wash liquors from said cellulose ether.

3. A method of separating a hot and cold water soluble sodium salt of carboxy methyl cellulose from a moist cellulose etherification reaction mixture containing said sodium salt in a fibrous condition with sodium chloride and sodium hydroxide as inorganic constituents, which comprises adjusting the pH of said mixture to below eight with the addition of an aqueous ethyl alcohol solution containing a compound chosen from the group consisting of nitric acid, hydrochloric acid, saturated lower carboxylic acids, ammonium salts of said acids and carboxylic acid anhydrides, said solution being such as to maintain the cellulose ether in a fibrous water soluble condition while bringing all of said sodium chloride into solution, expressing said saline aqueous alcoholic solution from said fibrous cellulose ether, washing said fibrous cellulose ether with aqueous alcoholic solutions of increasing alcoholic strength while maintaining said fibrous condition and preventing precipitation of inorganic salts onto said cellulose ether and expressing said wash liquors.

4. A method as claimed in claim 1 wherein said neutralizing compound is nitric acid.

5. A method as claimed in claim 2 wherein said neutralizing compound is a saturated lower carboxylic acid having a dissociation constant less than that of the cellulose hydroxy carboxylic acid.

6. A method as claimed in claim 1 wherein said neutralizing compound is an ammonium salt of a compound chosen from the group consisting of hydrochloric acid, nitric acid and saturated lower carboxylic acids.

7. A method as claimed in claim 3 wherein said etherification reaction mixture includes ethyl alcohol.

8. A method as claimed in claim 2 wherein said neutralization is partially effected with a strong inorganic acid and partially by addition of a saturated lower carboxylic acid having a dissociation constant less than that of the cellulose hydroxy carboxylic acid.

9. A method as claimed in claim 2 wherein said neutralization is partially effected with a strong inorganic acid and partially by further addition of an ammonium salt of a compound chosen from the group consisting of hydrochloric acid, nitric acid, and saturated carboxylic acids.

ALBERT AUBREY HOUGHTON.

REFERENCES CITED

The following references are of record in the file of this patent:

UNITED STATES PATENTS

| Number | Name | Date |
|---|---|---|
| 2,118,663 | Bradshaw | May 24, 1938 |
| 2,351,258 | Freeman et al. | June 13, 1944 |
| 2,357,469 | Houghton et al. | Sept. 6, 1944 |

OTHER REFERENCES

Ott, "Cellulose and Cellulose Derivatives," Interscience Publishers, Inc., New York, N. Y., 1943, p. 784.